(No Model.)

M. F. SANDERS.
BUNDLE HOLDER AND DROPPER FOR GRAIN BINDERS.

No. 273,317. Patented Mar. 6, 1883.

Witnesses.
Thos. H. Hutchins
Wm. J. Hutchins

Inventor.
Michael F. Sanders

UNITED STATES PATENT OFFICE.

MICHAEL F. SANDERS, OF GREEN GARDEN, ILLINOIS.

BUNDLE HOLDER AND DROPPER FOR GRAIN-BINDERS.

SPECIFICATION forming part of Letters Patent No. 273,317, dated March 6, 1883.

Application filed August 29, 1882. (No model.)

*To all whom it may concern:*

Figure 1:
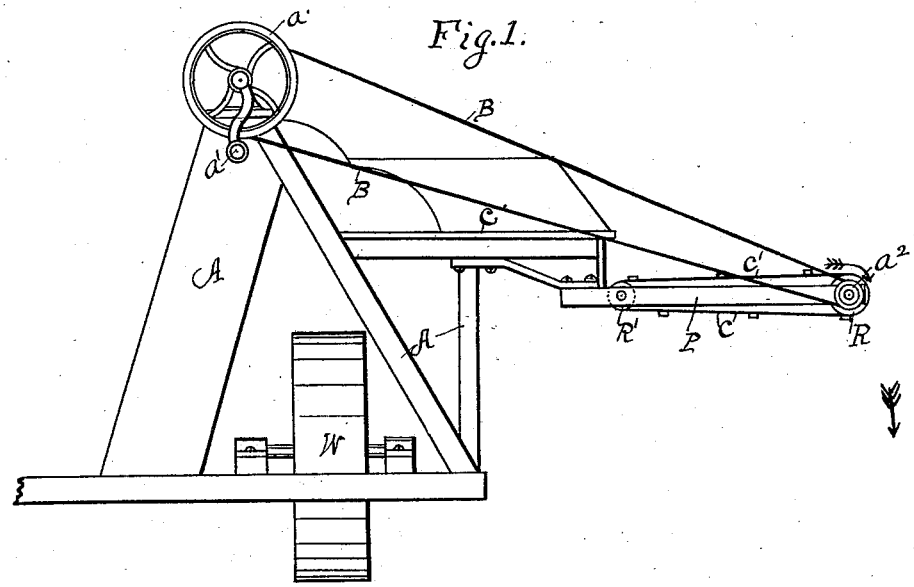
Figure 2:
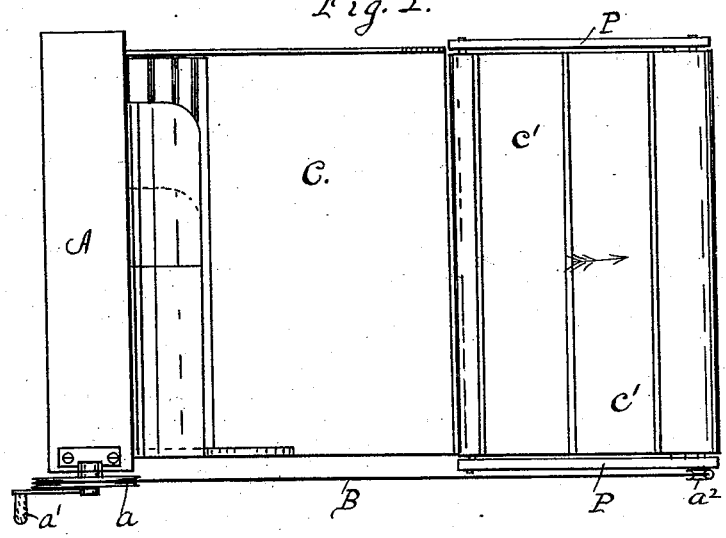

Be it known that I, MICHAEL F. SANDERS, of Green Garden, in Will county, and State of Illinois, have invented new and useful Improvements in Bundle Holders and Droppers for Grain-Binders for Harvesters, the construction and operation of which I will proceed to explain, reference being had to the annexed drawings and the letters and figures thereon, making a part of this my specification, which is as follows, to wit:

Figure 1 is a rear elevation, and Fig. 2 a plan view on the top, of that portion of a harvester showing my invention.

This invention has for its purpose the holding of bundles of grain, after they are bound, until the carrier has a suitable number, dropping them at stations in the field, thus leaving them collected in suitable numbers to suit, to be set up in shocks.

Referring to the drawings, A represents that portion of the frame of a harvester which supports the table $c$, on which the bundles are bound, being supported by the wheel W in the ordinary manner. The frame P is attached to the under part of the table $c$ in such a manner that it will be lower than the said table, and is provided with and contains the rollers R and R', on which an endless apron, $c'$, is operated by means of the pulley $a^2$, which is connected to the roller R by an ordinary shaft. The wheel $a$ is mounted on the harvester convenient to the operator, and is turned by the crank $a'$, which, when turned, operates the belt B, which turns the pulley $a^2$, thus operating the apron $c'$, as stated. After a number of bundles have been collected on the apron $c'$, and it is desired by the operator to drop them, he turns the crank $a'$, turning the wheel $a$, causing the belt B to turn the pulley $a^2$, which in turn causes the roller R to operate, thus operating the apron $c'$, which drops the bundles in the direction shown by the arrows.

The belt B may be of any suitable material, or it may be dispensed with and a sprocket-chain used in its place and operated by sprocket-wheels; and the apron $c'$ may be composed of a belt at either end, and provided with slats attached to it at short distances apart.

This device is intended as an attachment for self-binders that bind the sheaves and deposit them on the endless apron $c'$, which does not move automatically or continuously by attachment to the machine, but is only caused to move by the operator when, in his judgment, a sufficient number of sheaves for a shock are on the apron, the apron remaining stationary until so moved, and then the bundles are discharged away from the machine on a line with a row of bundles previously discharged, and out of the track of the machine on its return.

Having thus described my invention, what I claim as new and useful, and desire to secure by Letters Patent, is as follows, to wit:

In a bundle holder and dropper attachment for grain-binders, the endless apron $c'$, arranged on a plane below the table $c$, on the rollers R and R', and adapted to be rotated intermittently by the driver by means of the crank $a'$, pulleys $a$ and $a^2$, and belt B, to discharge a collection of bundles from the machine, as set forth.

MICHAEL F. SANDERS.

Witnesses:
WM. J. HUTCHINS,
THOS. H. HUTCHINS.